United States Patent
Pecoraro et al.

(10) Patent No.: US 10,961,126 B2
(45) Date of Patent: Mar. 30, 2021

(54) PROCESS FOR REDUCING FOULING IN EVAPORATORS IN LITHIUM HYDROXIDE RECOVERY

(71) Applicant: Veolia Water Technologies, Inc., Moon Township, PA (US)

(72) Inventors: Thomas Anthony Pecoraro, Plainfield, IL (US); Katie A. Winn, Plainfield, IL (US); David E. Gamache, Plainfield, IL (US)

(73) Assignee: Veolia Water Technologies, Inc., Moon Township, PA (US)

(*) Notice: Subject to any disclaimer, the term of this patent is extended or adjusted under 35 U.S.C. 154(b) by 4 days.

(21) Appl. No.: 16/047,483

(22) Filed: Jul. 27, 2018

(65) Prior Publication Data
US 2019/0039912 A1  Feb. 7, 2019

Related U.S. Application Data

(60) Provisional application No. 62/540,794, filed on Aug. 3, 2017.

(51) Int. Cl.
*C01D 15/02* (2006.01)
*B01D 9/00* (2006.01)
(Continued)

(52) U.S. Cl.
CPC .......... *C01D 15/02* (2013.01); *B01D 1/26* (2013.01); *B01D 9/0018* (2013.01); *B01D 9/0031* (2013.01); *B01D 9/0036* (2013.01); *B01D 9/0059* (2013.01); *B01D 9/0063* (2013.01); *C01D 1/42* (2013.01); *C01D 7/24* (2013.01)

(58) Field of Classification Search
None
See application file for complete search history.

(56) References Cited

U.S. PATENT DOCUMENTS

| | | | |
|---|---|---|---|
| 8,431,005 B1* | 4/2013 | Zbranek | C01D 5/00 205/482 |
| 9,034,294 B1* | 5/2015 | Harrison | C01B 9/02 423/421 |

(Continued)

FOREIGN PATENT DOCUMENTS

| | | |
|---|---|---|
| CN | 104724729 A | 6/2015 |
| JP | H02196016 A | 8/1990 |

OTHER PUBLICATIONS

International Search Report dated Sep. 21, 2018 in re International Application No. PCT/US2018/044464 filed Jul. 31, 2018.

*Primary Examiner* — Melissa S Swain
(74) *Attorney, Agent, or Firm* — Coats & Bennett PLLC

(57) ABSTRACT

A method of concentrating and/or producing lithium hydroxide in an evaporator entails feeding a stream comprising lithium, hydroxide and carbonate to the evaporator. In the evaporator, the feed is concentrated to form lithium hydroxide and lithium carbonate crystals. Further, the method entails reducing the tendency of lithium carbonate to scale the evaporator by increasing the concentration of lithium carbonate crystals in the evaporator by: (1) clarifying at least a portion of the concentrate in the evaporator to form a clarified solution; and (2) discharging the clarified solution as a clarified solution stream from the evaporator.

11 Claims, 3 Drawing Sheets

(51) Int. Cl.
*C01D 1/42* (2006.01)
*C01D 7/24* (2006.01)
*B01D 1/26* (2006.01)

(56) References Cited

U.S. PATENT DOCUMENTS

| | | |
|---|---|---|
| 2011/0044882 A1 | 2/2011 | Buckley et al. |
| 2012/0203826 A1* | 8/2012 | Stich ................. H04L 67/42 |
| | | 709/203 |
| 2017/0175228 A1* | 6/2017 | Hunwick ................. C22B 5/10 |

* cited by examiner

PROCESS FOR REDUCING FOULING IN EVAPORATORS IN LITHIUM HYDROXIDE RECOVERY

BACKGROUND

Lithium hydroxide monohydrate is an important component in storage batteries, among other applications. Battery grade lithium hydroxide monohydrate, however, is complicated and costly to produce. For example, these systems utilize evaporation systems to concentrate lithium hydroxide. In many cases, the lithium hydroxide brines used in these processes further include carbonate. Because the solubility of lithium carbonate decreases as temperature increases, the evaporation systems experience significant fouling and scaling on the heat transfer surfaces. The scaling and fouling is substantial and forces evaporator systems to frequently cease their operations for cleaning.

If fouling could be reduced, the evaporation systems could be run for significantly longer periods of time. This would, in turn, reduce operating costs and allow for greater lithium hydroxide recovery. There is, therefore, a need for methods of controlling scaling and fouling while allowing sufficient recovery of lithium hydroxide.

SUMMARY

The present application is directed to methods of concentrating lithium hydroxide in an evaporator, and at the same time, reducing the tendency for lithium carbonate to scale the evaporator. A feed comprising lithium, hydroxide, and carbonate is directed to the evaporator. The feed is concentrated in the evaporator to produce a concentrate. The concentrate includes lithium and hydroxide, as well as lithium carbonate crystals. The tendency for lithium carbonate to scale the evaporator is reduced by increasing the concentration of lithium carbonate crystals in the evaporator. Lithium carbonate crystal concentration can be increased by several techniques such as: (1) clarifying a portion of the concentrate in the evaporator to form a clarified solution, discharging the clarified solution as a clarified solution stream from the evaporator, and separately discharging a portion of the concentrate a slurry stream; (2) adding lithium carbonate seed crystals to the feed; or (3) recycling lithium carbonate crystals from a downstream process back into the evaporator.

In one particular embodiment, the method described herein comprises:
A method of concentrating lithium hydroxide in an evaporator, and at the same time, reducing the tendency for lithium carbonate to scale the evaporator, comprising:
 (A) directing a feed comprising lithium, hydroxide, and carbonate to the evaporator;
 (B) concentrating the feed in the evaporator to produce a concentrate including lithium hydroxide, and lithium carbonate crystals;
 (C) reducing the tendency for lithium carbonate to scale the evaporator by increasing the concentration of lithium carbonate crystals in the evaporator by:
  (i) clarifying at least a portion of the concentrate in the evaporator to form a clarified solution; and
  (ii) discharging the clarified solution as a clarified solution stream from the evaporator.
In another embodiment, the method comprises:
A method of producing lithium hydroxide monohydrate crystals in a system comprising an evaporator and a crystallizer arranged in series, and reducing the tendency of lithium carbonate to scale the evaporator, the method comprising:
 (A) directing a feed comprising lithium, hydroxide, and carbonate to the evaporator;
 (B) concentrating the feed in the evaporator to produce a concentrate including lithium hydroxide, and lithium carbonate crystals;
 (C) reducing the tendency for lithium carbonate to scale the evaporator by increasing the concentration of lithium carbonate crystals in the evaporator by:
  (i) clarifying at least a portion of the concentrate in the evaporator to form a clarified solution;
  (ii) discharging the clarified solution as a clarified solution stream from the evaporator;
 (D) directing the clarified solution stream and the slurry stream from the evaporator to the crystallizer where the clarified solution stream and the slurry stream form a lithium hydroxide solution in the crystallizer;
 (E) circulating the lithium hydroxide solution through the crystallizer and concentrating the lithium hydroxide solution;
 (F) employing the crystallizer to form the lithium hydroxide monohydrate crystals and lithium carbonate crystals in the crystallizer; and
 (G) separating the lithium hydroxide monohydrate crystals from the lithium carbonate crystals.

Other objects and advantages of the present invention will become apparent and obvious from a study of the following description and the accompanying drawings which are merely illustrative of such invention.

DRAWINGS

DETAILED DESCRIPTION

The present application is directed to methods of concentrating lithium hydroxide in an evaporator while reducing lithium carbonate fouling and scaling in the evaporator. A feed comprising lithium, hydroxide, and carbonate is directed to the evaporator, where it is concentrated. As concentration progresses in the evaporator, lithium carbonate in the concentrate has a tendency to form lithium carbonate crystals. A lithium carbonate slurry is formed in the evaporator, promoting the additional crystallization of lithium carbonate on existing crystals as opposed to heat transfer surfaces. The concentration of lithium carbonate crystals in the concentrate is further increased by clarifying at least a portion of the concentrate in the evaporator to form a clarified solution and discharging the clarified solution as a clarified solution stream from the evaporator. A separate slurry stream may also be used to discharge a portion of the concentrate to further control the lithium carbonate concentration.

Preferably, the evaporator used in these methods is configured to utilize forced circulation evaporation, suppressing boiling in the heat exchanger tubes. Some embodiments may include falling film evaporators, mechanical vapor recompression ("MVR") evaporators, and thermal vapor recompression ("TVR") evaporators. In at least one embodiment, a multi-effect evaporation is used to concentrate lithium hydroxide, followed by at least one crystallizer to crystallize lithium hydroxide monohydrate. The evaporator(s) (and/or crystallizer(s)) utilized herein are configured to maintain a circulating slurry of lithium carbonate crystals within the evaporator or evaporator effects. The slurry controls the supersaturation of lithium carbonate during concentration in the evaporator and promotes lithium carbonate crystallization on the slurry as opposed to the heat transfer surfaces.

A desired concentration of lithium carbonate crystals may be determined for each evaporator (or evaporator stage). In some embodiments, the slurry is formed utilizing lithium carbonate seed material to better aid in slurry formation and obtaining a desired concentration.

Slurry and clarified concentrate may be transferred to or from an evaporator to maintain the desired lithium carbonate crystal concentration. The slurry and clarified concentrate are discharged from the evaporator via separate streams. To produce a clarified stream from the concentrate, the clarified solution may be drawn from the evaporator through, for example, a clarification baffle in the evaporator bodies, a clarification cylinder in the recirculation piping, or hydrocyclones. Removing the clarified solution increases the solids concentration in the system. Thus, the solids concentration may be controlled by adjusting the relative flow rates of the separate clarified solution and slurry streams discharged.

Figure 1:
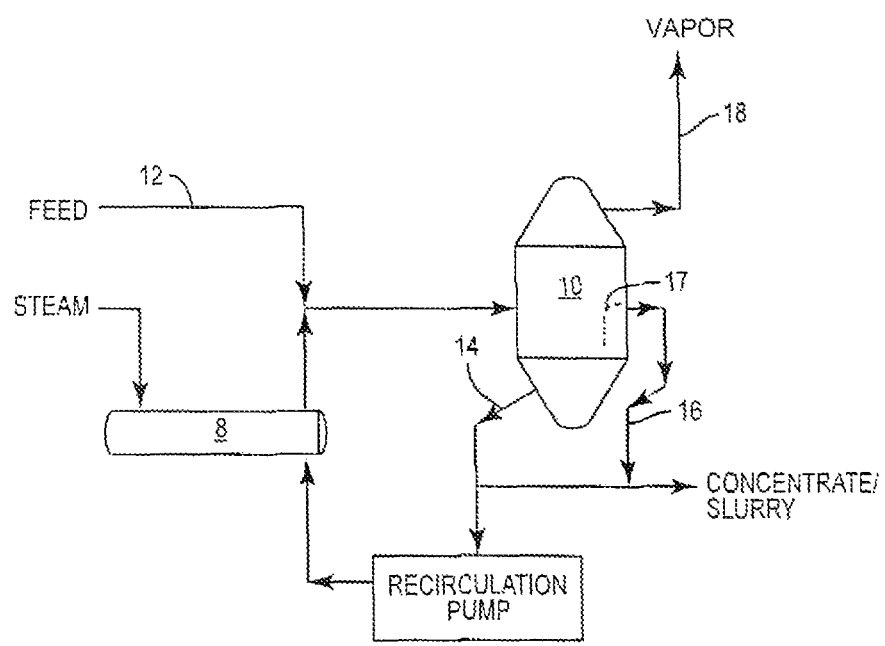
FIG. 1 depicts a schematic showing one embodiment of the methods described herein.

Turning now to the drawings, FIG. 1 shows one embodiment of the methods for concentrating lithium hydroxide. A feed 12 containing lithium, carbonate, and hydroxide is directed into evaporator 10. The evaporator 10 concentrates the solution. Steam 18 is produced and may be utilized in other processes. For example, in some embodiments, steam 18 may be directed to upstream preheaters used to preheat the feed 12, while in other embodiments steam 18 may be directed to separate processes within the plant.

Evaporator 10 includes lithium carbonate crystals. In some embodiments, the lithium carbonate crystals already at least partially exist in the evaporator when the feed 12 enters the evaporator 10. For example, fresh seed material may be placed in the evaporator 10 or lithium carbonate crystals from other evaporators in a lithium hydroxide production system may be directed to the evaporator 10. In other embodiments, the lithium carbonate crystals are not present when feed 12 initially enters the evaporator 10 but forms during the concentration of the feed.

The lithium carbonate crystals are circulated in evaporator 10 as a slurry. The circulating slurry encourages lithium carbonate in solution in evaporator 10 to come out of solution and crystalize onto the slurry. Because lithium carbonate crystals are forming on the slurry, formation of lithium carbonate scaling on the heat transfer surfaces is reduced or minimized.

Evaporator 10 is designed such that a clarified solution may be withdrawn from the evaporator separately from the slurry. In a preferred embodiment, the clarified solution is essentially clear, with little to no suspended solids. To remove the clarified solution, evaporator 10 includes a clarification system 17 for yielding a clarified solution 16. The clarification system 17 may be, for example, a clarification cylinder in recirculation piping or a hydrocyclone. In a preferred embodiment, the clarification system 17 is a clarification baffle in the evaporator. Removal of the clarified solution through clarification system 17 allows for the increased collection of lithium carbonate solids. Slurry 14 may also be removed from the evaporator 10. This is an optional process step. In some cases, the clarified solution will contain some solids and this, in certain cases, will be sufficient to remove the amount of solids produced. Slurry 14 may be recirculated back to the evaporator 10 or may be sent elsewhere, such as to another evaporator. While both slurry and clarified solution may be removed from the evaporator, they are removed through separate streams.

In some embodiments, the solids concentration in the evaporator may be monitored and maintained within certain concentrations. For example, in order to increase the concentration of lithium carbonate in the evaporator, the clarified solution may be withdrawn from the evaporator. Other processes that may be utilized in conjunction with the processes described herein to increase the concentration of lithium carbonate solids in the evaporator include adding lithium carbonate crystals to the feed. In other embodiments, concentrate comprising slurry may be sent to a hydrocyclone, settler, or filter, where crystals are separated and then recycled back to the evaporator. For example, in one embodiment, it may be desired to maintain a solids concentration at about 5% of the concentrate. If the solids concentration becomes too low, clarified solution may be withdrawn to increase the solids concentration to approximately 5%.

Figure 2:
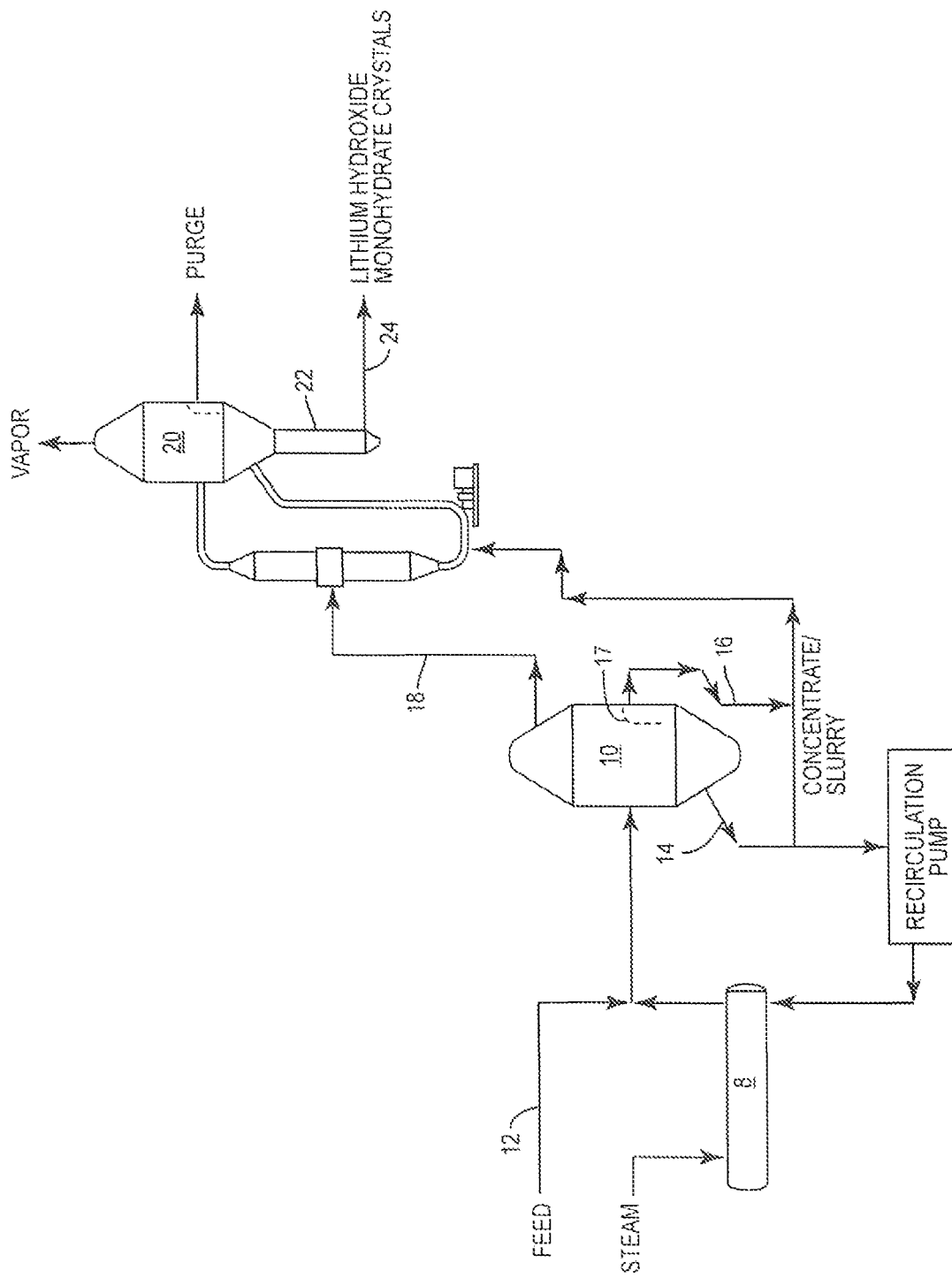
FIG. 2 depicts a schematic showing a second embodiment of the methods described herein that further includes recovery of lithium hydroxide monohydrate crystals.

FIG. 2 shows a second embodiment of the invention, in which evaporator 10 is positioned in series with a crystallizer 20. Evaporator 10 operates as described with respect to FIG. 1. Thereafter, clarified solution 16 and/or slurry may be transferred to crystallizer 20. Crystallizer 20 crystallizes lithium hydroxide monohydrate crystals. Some lithium carbonate crystals may also be formed. In some embodiments, it may be preferable to separately direct slurry 14 to crystallizer 20 and to maintain a lithium carbonate slurry in crystallizer 20 to avoid scaling and fouling.

After crystallization, lithium carbonate crystals are segregated from lithium hydroxide monohydrate crystals. One preferred method of segregating such crystals is with elutriation. As shown in the exemplar FIG. 2, the crystals are sent to elutriation leg 22. Elutriation leg 22 separates the lithium hydroxide monohydrate crystals from any lithium carbonate crystals. The lithium hydroxide monohydrate crystals 24 may then be sent for further processing.

Figure 3:
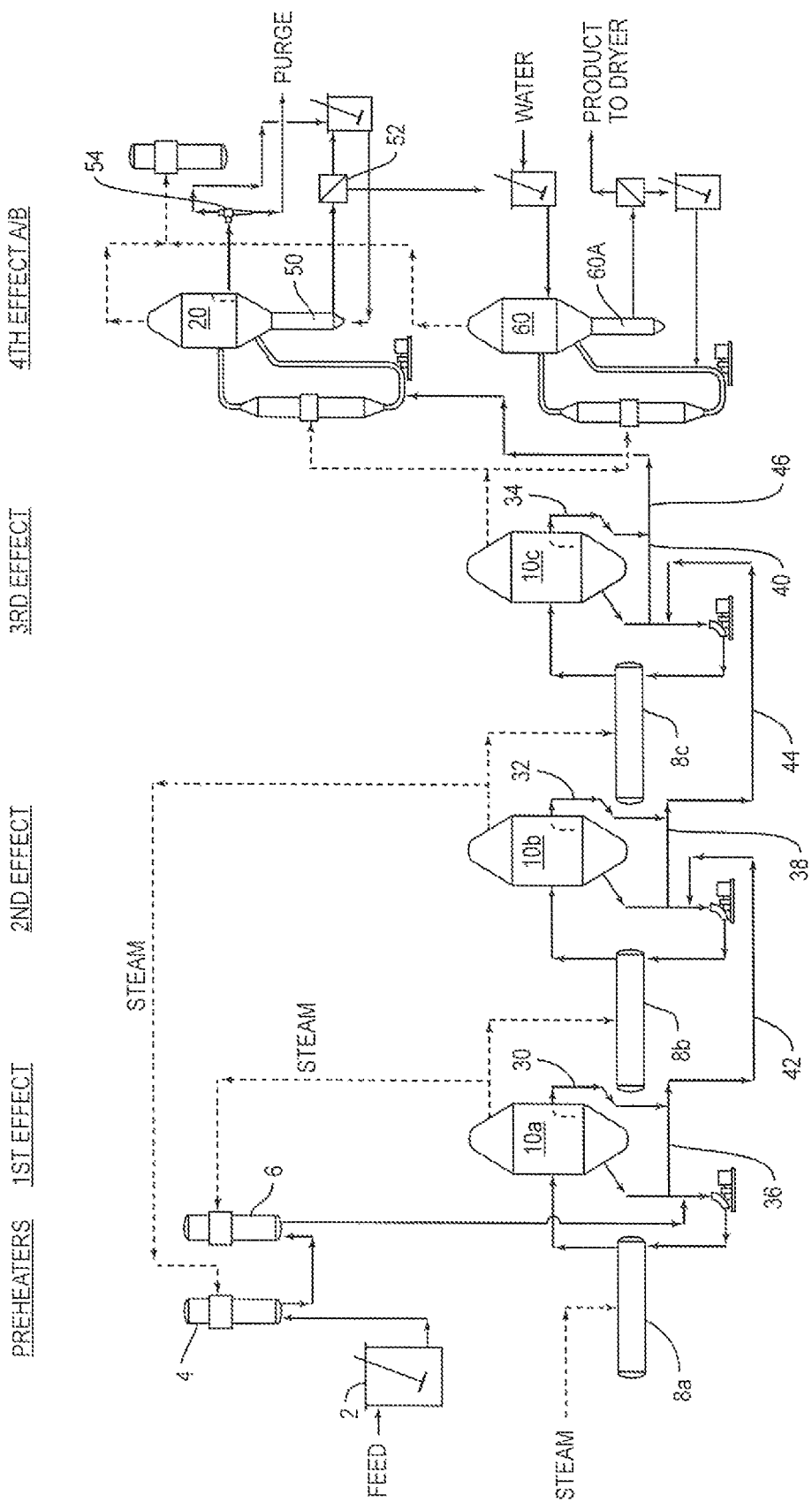
FIG. 3 depicts a schematic showing a third embodiment of the methods described herein that further includes the recovery of purified lithium hydroxide monohydrate crystals.

In some processes, it may be desirable to use a multi-effect evaporator system. For example, a chain of evaporators and crystallizers may be used to produce purified lithium hydroxide monohydrate crystals. By way of example, FIG. 3 shows one embodiment of such a system.

A lithium hydroxide brine is contained in reactor 2. The brine is then heated in a series of preheaters; first in preheater 4 and then in preheater 6. The heated brine is directed from preheater 6 to a chain of evaporators. The exemplar embodiment comprises three evaporators: 10a, 10b, and 10c. Each evaporator operates in the manner evaporator 10 operates, as described with regard to FIG. 1 above. Each evaporator 10a, 10b, and 10c contains a circulating slurry of lithium carbonate crystals. Contents of each evaporator are further circulated through a heat exchange (8a, 8b, and 8c, respectively), and then returned to their respective evaporator.

When using multiple evaporators, slurry may be circulated between the evaporators via slurry lines. The circulation between evaporators may be used, inter alia, to control the slurry concentration in each evaporator 10a, 10b, and 10c. Each evaporator 10a, 10b, and 10c further includes a clarification system such as discussed with respect to the evaporator of FIG. 1. Clarified solution from evaporator 10a is removed via that evaporator's clarification system and is sent to evaporator 10b. Similarly, clarified solution from evaporator 10b is removed through that evaporator's clarification system, and directed to evaporator 10c. Note the series of clarified solution streams 30, 32 and 34 associated with the evaporators. Similarly, slurry may be removed from each of 10a, 10b, and 10c and transferred to the other evaporators in the series. Note also the slurry streams 36, 38 and 40 associated with the evaporators. These slurry streams comprise a portion of the concentrate being circulated through the respective evaporators. Also note that in this embodiment the clarified solution streams and the slurry streams are combined to form streams 42, 44 and 46. Stream 42 functions as a feed to evaporator 10b, stream 44 serves as a feed to evaporator 10c, and stream 46 serves as a feed for a first stage crystallizer 20.

Clarified solution and slurry discharged from evaporator 10c becomes the feed (stream 46) to a first stage crystallizer 20. Lithium hydroxide monohydrate crystals are produced by evaporation in the first stage crystallizer 20 in the manner described with respect to FIG. 2.

During concentration in the evaporators, lithium carbonate crystallization is anticipated to occur in each effect because the feed is essentially saturated with respect to lithium carbonate. As noted before, lithium carbonate is known to cause heater fouling in the evaporation systems, due to having an inverse solubility with respect to temperature. To minimize heater fouling, the evaporator effects will be operated with a significant suspension density of lithium carbonate crystals. This will promote lithium carbonate crystal formation and growth in the bulk slurry rather than on the heat exchange surfaces in the evaporators. To achieve the operating slurry *magna* density in each effect, the vessel is designed with internal clarification baffles, discussed above, so that essentially clear liquor is transferred out of each evaporator.

As noted above, crystallizer 20 produces lithium hydroxide monohydrate crystals during evaporation. The slurry produced by the crystallizer 20 is discharged through an integrated elutriation leg 50. Product slurry is removed from the elutriation leg outlet (at typically 40 wt. % total suspended solids) and is pumped to a centrifuge 52 associated with the first stage crystallizer. Slurry is dewatered in the centrifuge 52 to typically less than 5% moisture and washed in the centrifuge using processed condensate. Wetcake from the first stage crystallizer 20 is dissolved with clean condensate and becomes the feed to the second stage crystallizer 60. A portion of the liquor from the first stage centrate tank is fed to the multiple inlets of the elutriation leg 50. This liquor tends to flush the fine lithium carbonate crystals back into the crystallizer vessel and out of the lithium hydroxide monohydrate slurry that feeds the centrifuge.

A liquid purge stream is withdrawn from crystallizer 20 to remove soluble impurities, such as sodium and chloride from the circuit. The purge stream also contains the bulk of the crystallized lithium carbonate that was produced during evaporation. To avoid removing too much liquor with the solid lithium carbonate, the stream is pumped from a baffle section of the first stage crystallizer 20 through a hydrocyclone 54. The hydrocyclone overflow stream is directed to the centrate tank and the underflow slurry, which represents the liquid purge, is sent to a lithium carbonate recovery reactor.

Wetcake from the second stage crystallizer 60 is directed through product chutes to a conveyor which feeds a drying system. Purge from the second stage crystallizer 60 can be recycled to the first stage crystallizer 20.

As noted above, the wetcake is dissolved into clean condensate and forms the feed for the second stage crystallizer 60. The feed is directed into the second stage crystallizer 60 which is in series with crystallizer 20. Purified lithium hydroxide monohydrate crystals are produced by evaporation in the crystallizer 60. Crystallizer 60 further includes an elutriation leg 60A which allows for the separation of lithium hydroxide monohydrate crystals from remaining impurities, such as lithium carbonate crystals. The lithium monohydrate crystals are centrifuged and then sent to a drying system. The second stage crystallizer 60 may further produce a purge that can be recycled to the first stage crystallizer 20.

Although the present methods and processes have been shown and described in considerable detail with respect to only a few/particular exemplary embodiments thereof, it should be understood by those skilled in the art that it is not intended to limit the methods or processes to the embodiments, as various modifications, omissions, and additions may be made to the disclosed embodiments without materially departing from the novel teachings and advantages described herein.

What is claimed is:

1. A method of concentrating lithium hydroxide in an evaporator, and at the same time, reducing the tendency for lithium carbonate to scale the evaporator, comprising:
    (A) directing a feed comprising lithium, hydroxide, and carbonate to the evaporator;
    (B) concentrating the feed in the evaporator to produce a concentrate including lithium hydroxide, and lithium carbonate crystals;
    (C) reducing the tendency for lithium carbonate to scale the evaporator by increasing the concentration of lithium carbonate crystals in the evaporator by:
        (i) clarifying at least a portion of the concentrate in the evaporator to form a clarified solution; and
        (ii) discharging the clarified solution as a clarified solution stream from the evaporator.

2. The method of claim 1, further comprising directing the clarified solution to a crystallizer and crystallizing lithium hydroxide.

3. The method of claim 1 wherein the evaporator is disposed in series with a crystallizer and wherein the method further includes combining the clarified solution stream with a slurry stream separately discharged from the evaporator to form a mixture; directing the mixture to the crystallizer; and in the crystallizer, crystallizing the mixture and forming lithium hydroxide crystals.

4. The method of claim 3 wherein the crystallizer also forms lithium carbonate crystals; and the method further includes separating the lithium hydroxide crystals from the lithium carbonate crystals.

5. The method of claim 1 including further reducing the tendency for lithium carbonate to scale the evaporator by seeding the evaporator with lithium carbonate crystals.

6. The method of claim 1 including circulating the lithium carbonate crystals through the evaporator.

7. The method of claim 3 including controlling solids concentration in the evaporator by adjusting the flow rates of the clarified solution stream and the slurry stream discharged from the evaporator.

8. A method of producing lithium hydroxide monohydrate crystals in a system comprising an evaporator and a crystallizer arranged in series, and reducing the tendency of lithium carbonate to scale the evaporator, the method comprising:

(A) directing a feed comprising lithium, hydroxide, and carbonate to the evaporator;

(B) concentrating the feed in the evaporator to produce a concentrate including lithium hydroxide, and lithium carbonate crystals;

(C) reducing the tendency for lithium carbonate to scale the evaporator by increasing the concentration of lithium carbonate crystals in the evaporator by:
   (i) clarifying at least a portion of the concentrate in the evaporator to form a clarified solution;
   (ii) discharging the clarified solution as a clarified solution stream from the evaporator;

(D) separately discharging a portion of said concentrate from the evaporator as a slurry stream;

(E) directing the clarified solution stream and the slurry stream from the evaporator to the crystallizer where the clarified solution stream and the slurry stream form a lithium hydroxide solution in the crystallizer;

(F) circulating the lithium hydroxide solution through the crystallizer and concentrating the lithium hydroxide solution;

(G) employing the crystallizer to form the lithium hydroxide monohydrate crystals and lithium carbonate crystals in the crystallizer; and (H) separating the lithium hydroxide monohydrate crystals from the lithium carbonate crystals.

9. The method of claim 8 wherein the crystallizer includes an elutriation leg and the method entails directing the lithium hydroxide monohydrate crystals and the lithium carbonate crystals to the elutriation leg which separates the lithium hydroxide monohydrate crystals from the lithium carbonate crystals.

10. The method of claim 8 wherein the evaporator forms one effect of a multi-effect evaporation system disposed upstream of the crystallizer and wherein each effect of the multi-effect evaporator system produces the clarified solution stream and the slurry stream, and wherein the clarified solution steams and the slurry streams are combined and directed into the crystallizer for the production of lithium hydroxide monohydrate crystals.

11. The method of claim 1 wherein reducing the tendency for lithium carbonate to scale the evaporator by increasing the concentration of lithium carbonate crystals in the evaporator, further includes separately discharging a portion of said concentrate as a slurry stream.

* * * * *